United States Patent

Mariani et al.

[11] Patent Number: 6,164,537
[45] Date of Patent: Dec. 26, 2000

[54] PLANT INVENTORY, DISTRIBUTION AND DISPLAY SYSTEM

[75] Inventors: Frank Mariani, Lake Forest; Roy Klehm, South Barrington; Kit Klehm, Barrington Hills; John Cusack, Chicago, all of Ill.

[73] Assignee: Klehm Ornamentals, LLC, Hampshire, Ill.

[21] Appl. No.: 09/115,126

[22] Filed: Jul. 14, 1998

[51] Int. Cl.[7] .................................................. G06K 15/00
[52] U.S. Cl. .......................... 235/383; 235/385; 414/286
[58] Field of Search ................................... 414/286, 273; 47/1.7, 65, 66.1, 66.7, 84, 39, 901; 235/383, 385, 462.15

[56] References Cited

U.S. PATENT DOCUMENTS

| | | |
|---|---|---|
| D. 237,898 | 12/1975 | Austin et al. . |
| 1,261,504 | 4/1918 | Fitch . |
| 3,314,192 | 4/1967 | Park . |
| 3,913,758 | 10/1975 | Faircloth et al. . |
| 3,998,007 | 12/1976 | Martin . |
| 4,028,847 | 6/1977 | Davis et al. . |
| 4,216,615 | 8/1980 | Soderberg et al. . |
| 4,259,907 | 4/1981 | Schuck . |
| 4,356,664 | 11/1982 | Ruthner . |
| 4,476,651 | 10/1984 | Drury . |
| 4,513,531 | 4/1985 | Lestraden . |
| 4,547,992 | 10/1985 | Wingerden . |
| 4,591,705 | 5/1986 | Toudou . |
| 4,793,096 | 12/1988 | Todd, Sr. . |
| 4,837,971 | 6/1989 | Visser . |
| 4,876,967 | 10/1989 | Postma . |
| 4,887,208 | 12/1989 | Schneider et al. . |
| 5,016,541 | 5/1991 | Feaster, Jr. . |
| 5,038,283 | 8/1991 | Caveney . |
| 5,233,931 | 8/1993 | McCorkle, Jr. . |
| 5,438,794 | 8/1995 | Wi . |
| 5,445,485 | 8/1995 | Poutet ................................ 414/286 X |
| 5,582,497 | 12/1996 | Noguchi ............................. 414/286 X |
| 5,609,451 | 3/1997 | McCorkle, Jr. . |
| 5,645,390 | 7/1997 | Filiberti et al. ..................... 414/273 X |
| 5,646,389 | 7/1997 | Bravman et al. . |
| 5,664,928 | 9/1997 | Stauber .............................. 414/286 X |
| 5,673,511 | 10/1997 | Holtkamp, Jr. . |

*Primary Examiner*—Karl D. Frech
*Attorney, Agent, or Firm*—Piper Marbury Rudnick & Wolfe

[57] ABSTRACT

A system for inventorying and distributing potted plants for a greenhouse includes a system of elevated rails disposed throughout the greenhouse. Rolling benches travel on the system of rails so that the potted plants may be transported to and from proper growth positions in the greenhouse. Plants that are ready to be shipped to retailers are tagged with labels via hog rings and loaded from a rolling bench onto a spacer tray that features receptacles sized so as to prevent the plants from tipping during transport. A number of spacer trays are loaded onto a rolling plant rack for delivery to a retailer's store via a delivery truck. Filled plant racks are rolled off of the delivery truck and into position at the retailer's store and exchanged for empty plant racks. The plant racks feature shelves that are spaced to allow easy plant maintenance in the store. The shelves are also tilted to allow display of the plants. The plant pots, spacer tray and plant rack may include color and ornamental indicia identifying the greenhouse of origin for the plants or a brand mark. Bar code labels are attached to the plant racks, spacer trays and plant pots and are scanned by bar code scanners at the greenhouse and retailers' stores so that useful tracking data may be collected.

11 Claims, 6 Drawing Sheets

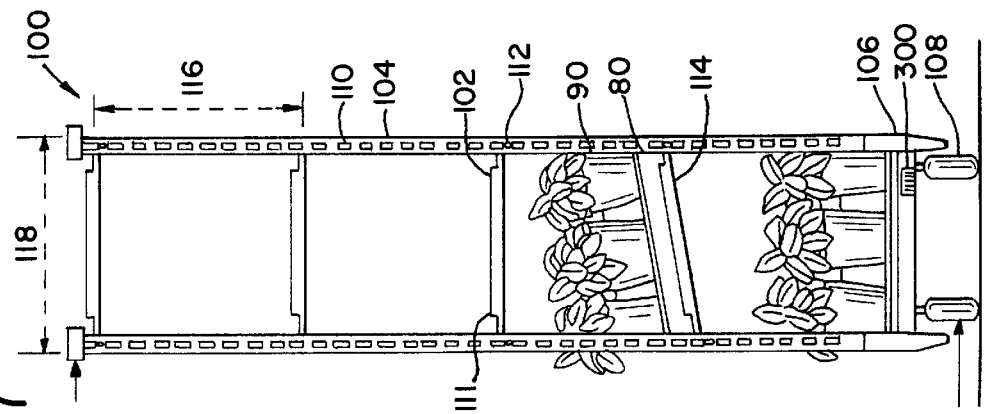
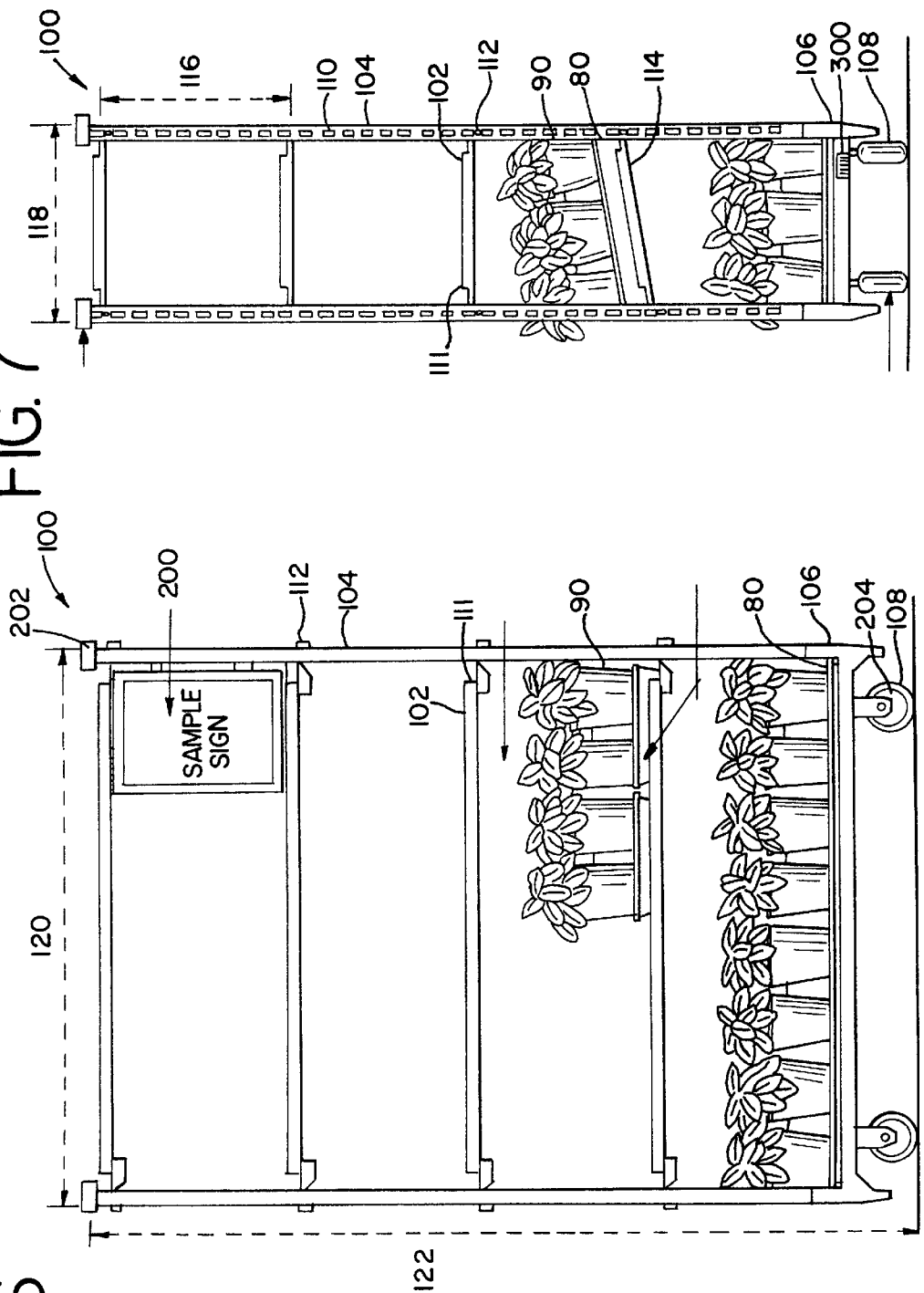

PLANT INVENTORY, DISTRIBUTION AND DISPLAY SYSTEM

BACKGROUND OF THE INVENTION

For a variety of reasons the sale of ornamental plants, such as perennials and woody plants, from mass merchandisers' large retail stores is on the increase. In response to this increased demand, retailers are motivated to obtain from growers and display at their stores large volumes of high quality plants in an efficient manner. Ornamental plant growers and suppliers are thus under competitive pressures to provide high quality plant materials quickly and economically. As a result, plant inventory, distribution and display systems that provide increased efficiency and plant quality benefit both retailers and ornamental plant growers and suppliers greatly.

A number of rail systems for facilitating greenhouse operations are known. For example, U.S. Pat. No. 3,913,758 to Faircloth et al. shows a hortaculture apparatus wherein pallets supporting potted plants are placed one each on carts. Each cart features a pair of parallel roller tracks upon which a pair of runners on the bottom of each pallet rest. A set of racks are positioned throughout a greenhouse and feature parallel roller tracks that may be aligned with the roller tracks of the carts so that the pallets may be rolled from the carts onto the racks and vice versa. As a result, plants may be potted and loaded onto one of the pallets as supported by one of the carts. The cart may then be transported to the greenhouse where the pallet may be transferred onto a rack so that the plants may continue to grow in the greenhouse. When the plants are ready for distribution, the pallet may be transferred from the rack onto the cart and the cart transported to a delivery truck loading area where the pallet may be unloaded.

U.S. Pat. No. 4,476,651 to Drury discloses an apparatus and method for transporting growing plants. With the apparatus of the '651 patent, plants are supported, positioned and transported in a hydroponic growing system (the growing of plants in nutrient solutions) by spaced troughs riding on wheeled rails. The arrangement allows precise spacing to be maintained between the growing plants and allows the plants to be positioned at the appropriate location in the greenhouse to control the growing environment, both of which are important in hydroponic growth systems.

U.S. Pat. No. 4,028,847 to Davis et al. shows a apparatus for producing plants that is particularly well suited for hydroponic applications. The apparatus of the '847 patent features a rail system upon which wheeled carts transport trays of plants automatically through a number of growth chambers. Each growth chamber features temperature, humidity and lighting conditions that are appropriate for a given stage of plant development.

U.S. Pat. No. 4,876,967 to Postma discloses plant trays featuring rollers fixed thereunder for travel upon parallel spaced beams. A transporter featuring an electric motor and drive wheels that engage one of the beams allows the trays to be pushed or pulled so that movement through a greenhouse is obtained.

The heretofore known rail systems thus facilitate plant transport within greenhouses or nurseries. None of the rail systems, however, address plant distribution operations such as loading, transporting and displaying the plants. In other words, none of the known rail systems have been integrated with a distribution and display system that provides for the efficient distribution of high quality plants to mass merchandisers. There is clearly a need for such a system in the marketplace.

In the ornamental plant industry, potted plants may be loaded at the greenhouse onto trucks in a variety of ways. For example, the plants may be loaded by individual pots or collectively on rolling shelving units or racks. Also, the plants may be loaded onto rolling racks or the trucks directly via trays contoured to prevent the plant pots from shifting. These trays are known in the art as "inserts" or "spacer trays." The plants are unloaded from the trucks at retail stores in a similar manner.

Loading and unloading plants individually to and from a truck is inefficient from a labor and time perspective. In addition, such operations are typically performed by hurried persons who are unskilled in the correct handling of plants. As a result, the plants are often damaged or spoiled when they arrive to the retailer.

Existing rolling rack and insert arrangements present a number of disadvantages as well. It is undesirable for retailers to display plants on the floors of their stores in that the plants may be kicked or trampled. It is also undesirable for retailers to display plants on the asphalt of outdoor store areas. If the asphalt has been exposed to sunlight for a prolonged period of time, it will be very hot which is destructive to the roots of a potted plant placed thereon. As a result, it is advantageous for retailers to display plants on shelves. While retailers may display plants on existing shelving units, of the type that are either roll off of a truck or fixed at a store, such racks are typically not designed with optimal convenience, plant health or access in mind.

An example of an existing plant shelf is the McStack Shelf from The McStack Company of Marietta, Ga. This shelving system features individual shelves or tiers, the spacing between which may be adjusted in four-inch increments. Each tier may remain level or may be slanted downwards in a retailer's store for plant presentation, maintenance and access purposes. While the McStack Shelf offers the advantages of shelves that tilt, they may not be configured in a tilted position during transport as they do not feature inserts that prevent the plants from tipping. As a result, the McStack Shelf is transported with its loaded tiers in a level position. A retailer thus must tilt the loaded shelves after they arrive at the store. This additional step increases both inconvenience and the chance that the plants may be damaged. The inserts of the McStack Shelf also do not prevent plants that are initially positioned at the back of the shelf from sliding forward when plants from the front of the shelf are removed by customers. This may be of particular concern when the plants displayed are of the larger one-gallon variety.

As another example of existing plant shelving systems, U.S. Pat. No. 5,233,931 to McCorkle Jr. discloses trays for the transport and display of plants. The trays are stackable and may be loaded and unloaded from a transport truck by a machine such as a forklift. In the nursery or greenhouse, the trays are transported by wagons that are pulled by tractors or the like.

The trays feature sidewalls that may be configured in either vertical or horizontal positions. This allows the sidewalls of a tray loaded with plants to be configured in the vertical position during transport. When the loaded tray reaches its final destination, and the plants are to be displayed for sale, the sidewalls may be pivoted to the horizontal position so that they extend outward from the bottom surface of the tray. This allows the plants to be spread out for ease of viewing and access by customers.

While the trays of the '931 patent have proven effective, they suffer from a number of disadvantages. Their use requires the greenhouse operator to purchase additional machinery such as forklifts and tractors. Similarly, retailers are required to purchase forklifts to unload the trays. Such machinery, in addition to a high initial purchase cost, carries with it additional maintenance and operation costs.

In addition, while the trays of the '931 patent offer sidewalls that, when oriented in their vertical positions, prevent plants from tipping off of the trays, there is little or no protection against plants tipping on the trays themselves. This is a particular problem when trays are transported in a less than completely full condition. In addition to being dependent on the number of plants transported, this situation may occur when the pots of the plants being transported are individually sized in such as way that the tray area is not completely occupied.

Known inventory, distribution and display systems also lack any sort of automated inventory tracking system. In other words, they do not present a system whereby information pertaining to the delivery racks or plant inventory may be collected and recorded. Such a system would allow a grower to monitor plant delivery times as well as the location of delivery racks owned by the grower. In addition, such a system would help facilitate order picking, loading, accounting and shipping paperwork.

Accordingly, it is an object of the present invention to provide an efficient and integrated plant inventory, distribution and display system that overcomes the shortcomings of prior art systems.

SUMMARY OF THE INVENTION

The present invention is directed to a plant inventory, distribution and display system wherein plants, after being potted, are loaded upon rolling benches that travel upon a system of elevated rails disposed throughout a greenhouse or nursery. A load of plants is transported, via a rolling bench, to a growth position in the greenhouse where they are grown. After a proper amount of growth, the plants are transported once again via rolling benches to a shipping area.

In the shipping area, identifying labels are attached to the plant pots via hog rings. The potted plants are then loaded into a spacer tray with receptacles designed to prevent the plants from tipping during transport. When the spacer tray is filled, it is loaded upon a rolling plant rack. The rack features tilted shelves that receive several trays. The plant rack is then rolled onto a delivery truck for delivery to a retailer's store.

When the delivery truck arrives at the retailer's store, the plant rack is rolled off of the truck and directly into a display position. Empty plant racks that were previously brought to the retailer's store are rolled onto the delivery truck to be returned to the greenhouse for reloading. The shelves of the plant rack are spaced so that plant health may be easily maintained in the store. The tilted orientation of the shelves also allow the plants to be clearly displayed and accessed. The plant pots, plant tray and plant rack may feature color and ornamental indicia identifying the greenhouse or nursery or some brand mark associated with the plants.

The plant racks, spacer trays and pots are provided with bar code labels that may be scanned at the greenhouse and at retailers' stores. This allows the greenhouse to track plant delivery times, plant inventories, plant rack locations and other useful information.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 6 is a side elevational view of an embodiment of the plant rack of the present invention;

FIG. 7 is an end elevational view of the plant rack of FIG. 6;

DESCRIPTION OF THE PREFERRED EMBODIMENTS

Figure 1:
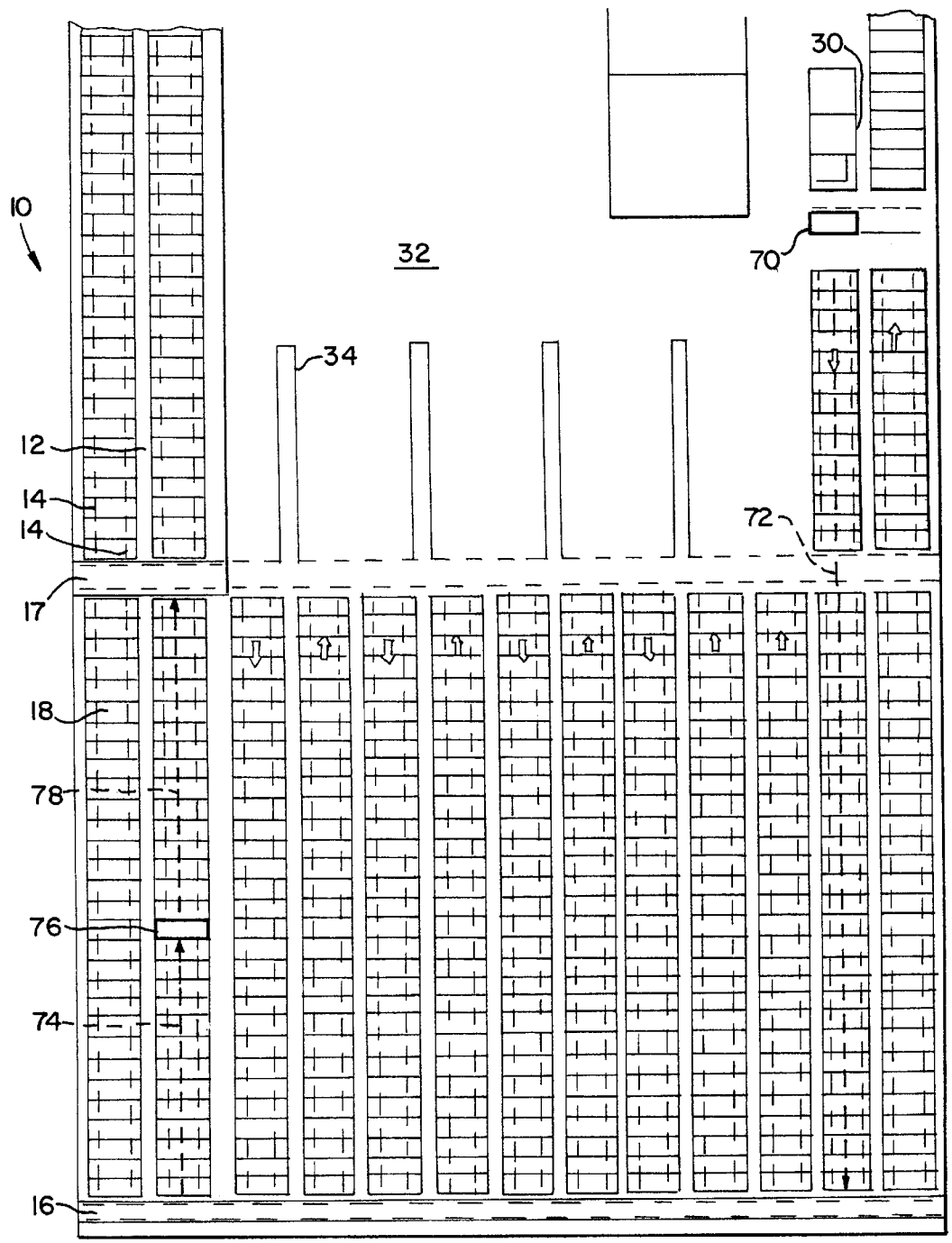
FIG. 1 is a top plan view of a portion of a greenhouse utilizing an embodiment of the plant inventory and distribution system of the present invention.

With reference to FIG. 1, a portion of a greenhouse, featuring an embodiment of the plant inventory and distribution system of the present invention, is indicated generally at 10. As is known in the art, the greenhouse 10 features a floor 12 constructed of gravel covered with weed matting. Alternatively, the floor may be constructed of concrete. A number of pairs of elevated parallel rails 14 run across the greenhouse and intersect on one end a set of elevated wheeled tracks 16. Rails 14 also intersect a set of main transit wheeled tracks 17 running through the center of the greenhouse. Rails 14 and wheeled tracks 16 and 17 are preferably made of metal. A number of rolling benches 18 allow potted plants to be transported along the rails 14 and wheeled tracks 16 and 17. The rolling benches preferably feature screened bottoms so that dirt spilled from the potted plants is not collected (see FIG. 3). The rolling benches 18 are preferably constructed of aluminum so that they are lightweight.

A potting machine 30 is positioned near one end of one of the pairs of rails 14. Suitable potting machines are available, for example, from the company Bouldin & Lawson of McMinnville, Tenn. A shipping area 32 features a number of conveyor systems 34 positioned near the main transit wheeled tracks 17.

Figure 2:
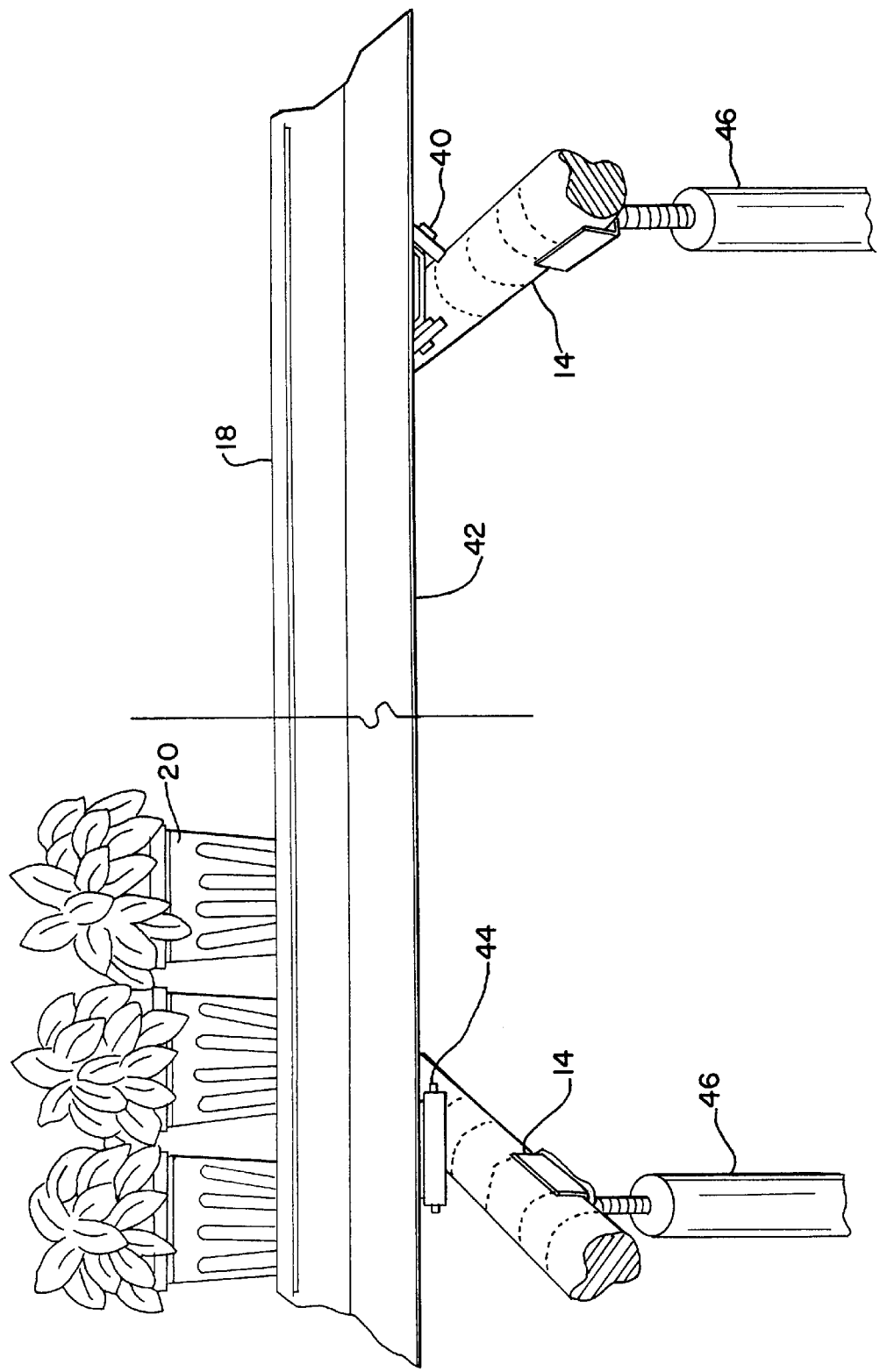
FIG. 2 is a perspective view of the rolling bench of the embodiment of FIG. 1.

Referring to FIG. 2, diagonal roller assemblies 40 are mounted to the bottom 42 of rolling bench 18. Each rolling bench 18 features four such roller assemblies mounted in a spaced relationship so that they may be pushed by a greenhouse worker along rails 14. Flat roller assemblies, such as the one indicated at 44 in FIG. 2, may be substituted for the diagonal roller assemblies 40 on one side of the rolling bench 18 so that rolling resistance is decreased. Rails 14 are supported in an elevated position above floor 12 (FIG. 1) of the greenhouse by adjustable stands 46. Such stands are known in the art. As a result, space is conserved so that more plants may be stored on the floor of the greenhouse and the rolling bench 18 is maintained at a level that allows greenhouse workers to load and unload potted plants 20 with ease.

Figure 3:
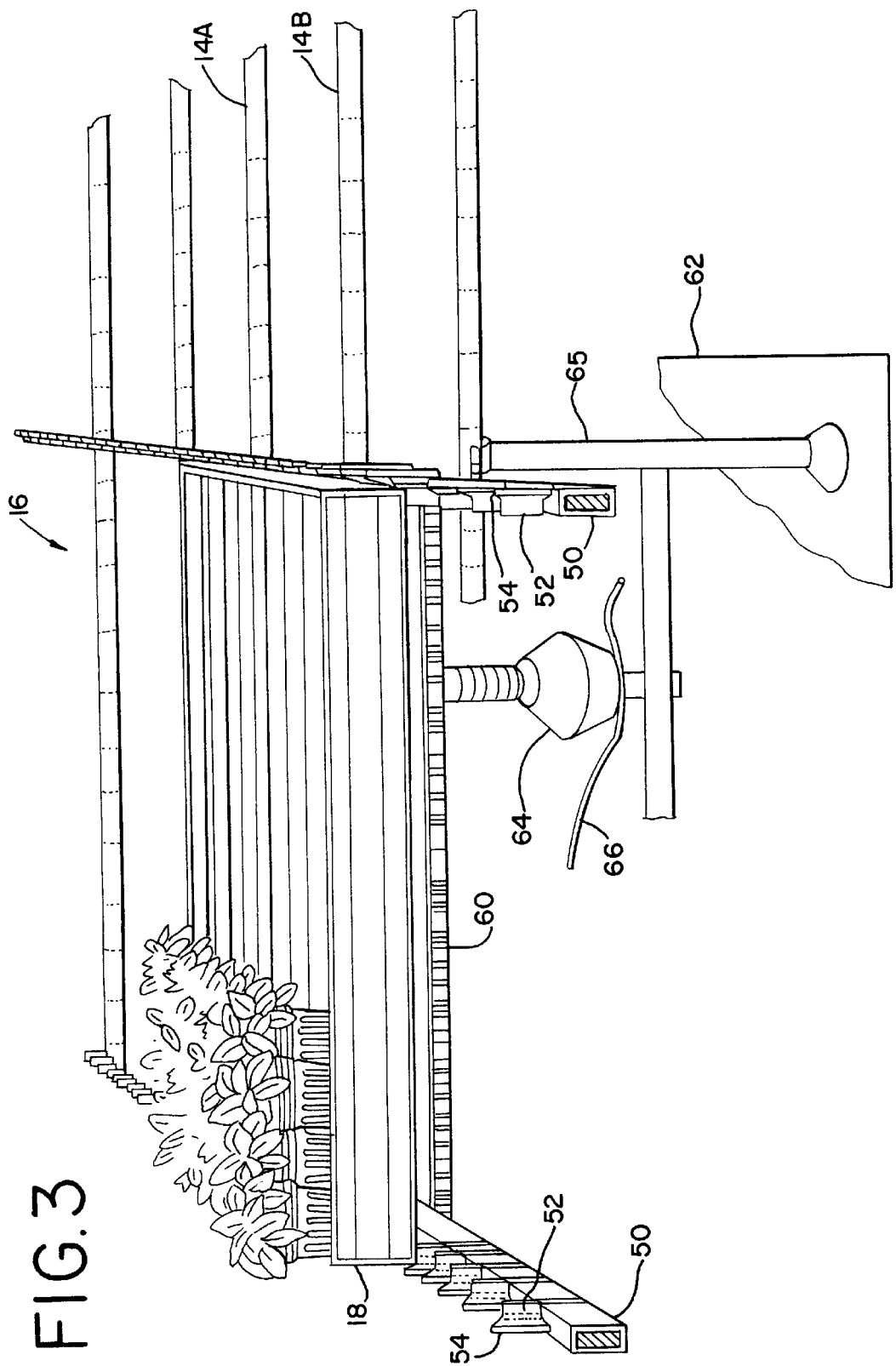
FIG. 3 is a perspective view of the wheeled tracks of the embodiment of FIG. 1.

As shown in FIG. 3, when rolling bench 18 pushed to the end of the pair of rails upon which it is traveling (indicated at 14A and 14B) it becomes positioned over the wheeled tracks indicated generally at 16. Alternatively, rolling bench 18 may be positioned over main transit wheeled tracks 17. Given the similarity between the two sets of wheeled tracks (16 and 17), their construction will be explained in terms of wheeled tracks 16. The set of wheeled tracks 16 includes a pair of rails or beams 50, each of which has mounted thereon a number of upturned wheels 52. The spacing of beams 50 is such that opposing edges of rolling bench 18 may be supported by the wheels 52.

A number of cross members 60 are connected to each one of the beams 50 so that appropriate spacing between the beams is maintained. Some of the cross members 60 are supported above a surface pad 62 by pneumatic actuators 64 mounted to a framework 65. Each supported cross member 60 has a pneumatic actuator 64 positioned proximate each end. For the sake of clarity, one of the pneumatic actuators is omitted and only portions of surface pad 62 and framework 65 are shown in FIG. 3. Surface pad 62 may be constructed of concrete or any other material that provides a level, rigid and strong supporting surface for framework 65. Pneumatic hose 66 allows air to be provided to the pneumatic actuators from a pressurized source (not shown). In operation, when the pneumatic actuators are pressurized, the set of wheeled tracks 16 is raised to the position illustrated in FIG. 3 so that the rolling bench 18 is lifted off of rails 14A and 14B by wheels 52. Such pneumatic "lift station" systems are known in the art and may be purchased, for example, from the company Frans Van Zaal, B. V. of Amsterdam, Netherlands.

After being "lifted" onto wheels 52, rolling bench 18 may be pushed along wheeled tracks 16 in a direction perpendicular to rails 14A and 14B. Each wheel 52 features a peripheral flange 54 so that the rolling bench does not slide sideways off of the wheeled tracks 16.

To summarize thus far, the rail system described in reference to FIGS. 1 through 3 allows the greenhouse to operate as follows. With reference to FIG. 1, freshly potted starter plants are removed from the potting machine 30, preferably potted in plastic pots, and loaded onto a rolling bench 70 positioned upon a pair of the rails 14. When the rolling bench 70 is filled with potted plants, it is pushed by one or more greenhouse workers along the pair of rails, as indicated by dashed arrow 72, until it reaches perpendicular wheeled tracks 16. By means of the pneumatic lift station system of FIG. 3, the rolling bench is transferred onto wheeled tracks 16 so that it may travel to the row where the plants will be stored during growth.

Through the use of another pneumatic lift station system, the rolling bench is transferred from the wheeled tracks 16 to the rails 14 corresponding to the selected row. As indicated by dashed arrow 74, the rolling bench is then pushed to an appropriate growth position, indicated at 76 as an example, along the row for growing the plants. Greenhouse workers then unload the potted plants from the rolling bench onto the floor 12 where they will be grown for an appropriate period of time. Alternatively, the plants may remain on the rolling bench as they grow for the appropriate period of time.

When the plants are ready to be shipped to retailers, a rolling bench loaded with the plants is conveyed, via one of the pair of parallel rails 14, towards and onto the main transit wheeled tracks 17, as indicated by dashed arrow 78, and ultimately to the greenhouse shipping area 32. The rail system of the present invention thus allows the entire greenhouse stock to be easily moved. As a result, the overall speed and efficiency of the greenhouse workers increases so that in effect one worker is able to do the work of many. The increased speed and efficiency availed by the rail system of the present invention is particularly beneficial in very large horticultural operations, such as when a greenhouse or nursery covers many acres.

Figure 4:
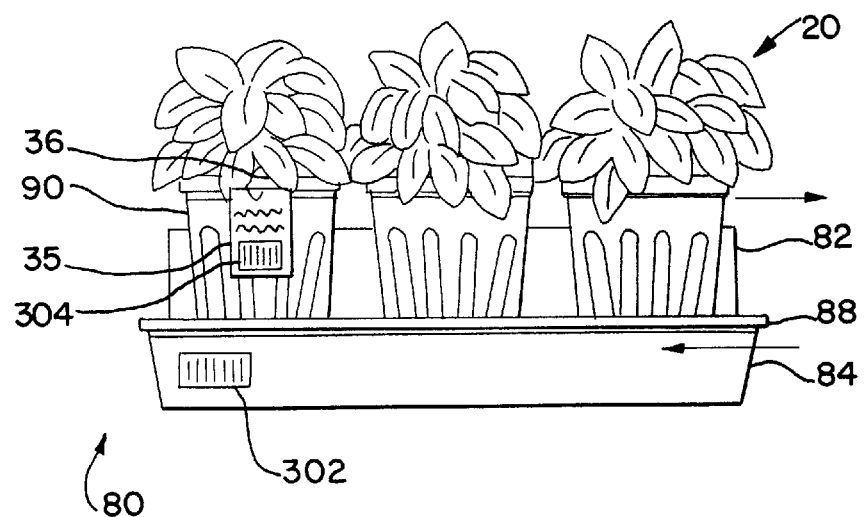
FIG. 4 is a side elevational view of an embodiment of the plant tray of the present invention loaded with potted plants.
Figure 5:
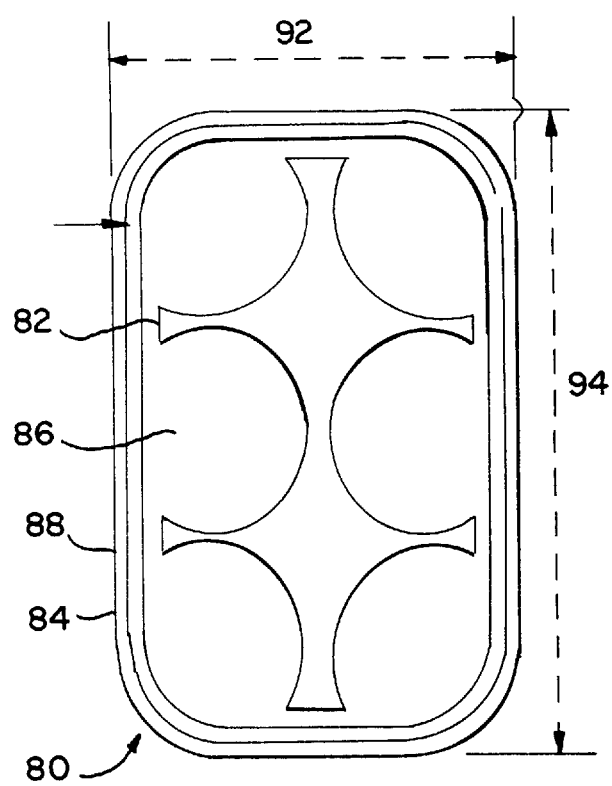
FIG. 5 is a top plan view of the plant tray of FIG. 4.

Once the rolling bench reaches the shipping area 32, the plants are individually unloaded and placed upon one of the conveyor systems 34 where descriptive plant labels 35 (see FIG. 4) are attached, preferably with metal hog rings 36 that pierce the side of the plastic pots. Tools for attaching such hog rings are well known in the art. The plants are then taken from the conveyor 34 and loaded onto inserts or spacer trays, such as the one generally indicated at 80 in FIGS. 4 and 5. As shown in FIG. 4, the combination of the hog rings 36 with the spacer trays 80 allow the labels 35 to be clearly observed and easily accessed.

It is to be understood that the above sequencing is presented as an example only and that variations thereof are possible. For example, the potted plants could be removed from the potting machine, tagged with hog rings and loaded into spacer trays positioned upon a rolling bench prior to movement to the growth position. As another example, the potted plants, after the growing period, could be tagged with hog rings and loaded into spacer trays positioned upon a rolling bench at the growth position for movement to the shipping area. A variation of this last example is to position the spacer trays on rolling shelves or racks, of the type to be described below, at the growth position for movement to the shipping area.

Spacer tray 80 is preferably molded of plastic or some other easily molded and lightweight material. It features a central divider portion 82 that, along with the tray side walls 84, defines a number of pot receptacles 86. Pot receptacles 86 preferably feature a cylindrical shape and are sized so as to prevent shifting and tilting of the potted plants 20 during handling of spacer tray 80 and while the plants are in transit aboard a delivery truck.

The pots 90 of the potted plants 20 are preferably sized so that their upper ends protrude above central divider portion 82. This allows plants 20 to be easily loaded onto spacer tray 80 by workers and easily unloaded by retailers or customers. Spacer tray 80 also features a peripheral rim 88 that workers may grip so as to load the spacer tray onto a plant rack such as the one described below. Spacer tray 80 may feature any number of pot receptacles 86 as an alternative to the six shown in FIGS. 4 and 5. It has been found that a width and depth, indicated by dashed lines 92 and 94, respectively, of approximately 12.5" and 19" allows a single tray 80 to accommodate six typical one-gallon perennial plants. These dimensions are presented as an example only and are not intended to limit the scope of the present invention.

Once a spacer tray 80 is filled with plants, it is loaded onto the plant rack of the present invention, an embodiment of which is generally indicated at 100 in FIGS. 6 and 7. Plant rack 100 features a plurality of shelves 102 supported at their corners by vertical members 104. Shelves 102 are preferably constructed of screen material so that they are lightweight. The screened construction of shelves 102 also prevents the accumulation of dirt spilled from the potted plants 20 and trays 80 and allows for root aeration as described below. A rack base 106 supports the four vertical members 104 and features pivoting wheels 108 disposed on each of its bottom corners. As a result, a person may easily push rack 100.

Figure 8:
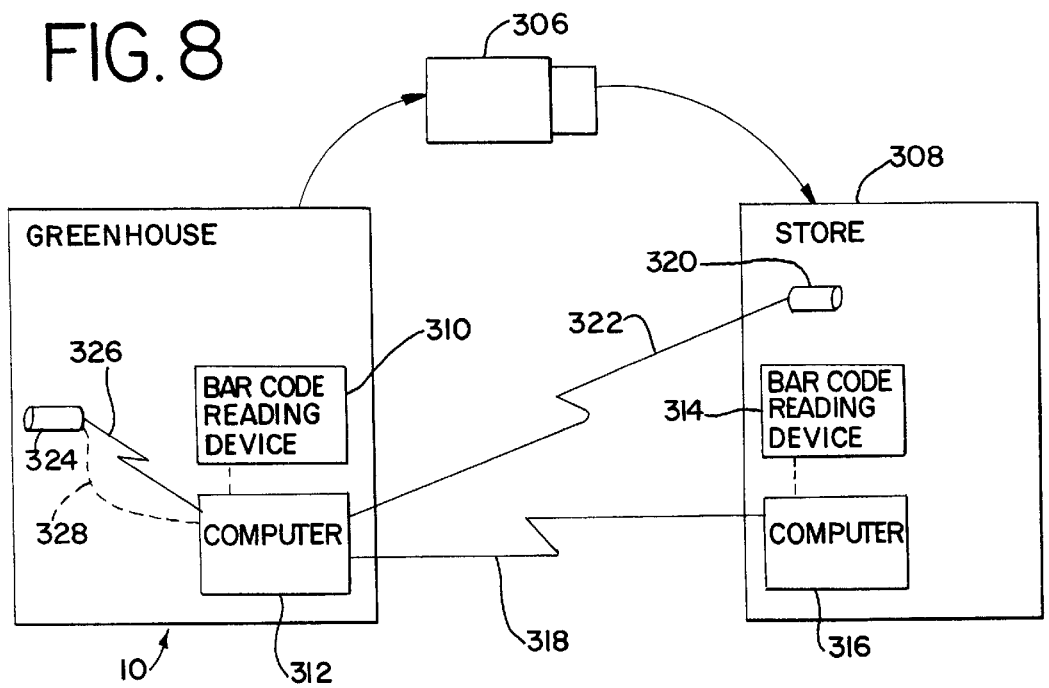
FIG. 8 is a block diagram showing an embodiment of the tracking subsystem of the present invention.

After the plant rack 100 is completely loaded with filled spacer trays 80, it is rolled from the greenhouse shipping area 32 (FIG. 1) onto a delivery vehicle such as a delivery truck (item 306 in FIG. 8). The delivery truck preferably features a lift gate trailer so that the driver may unload the racks without any assistance from store personnel or store equipment such as forklifts or receiving docks. In addition, the delivery truck is preferably sized so that a maximum number of plant racks 100 may be accommodated. Once the delivery truck is filled with plant racks 100, it is driven to a retailer's store where it is unloaded. The racks 100 are then rolled into a display position in the retailer's store so as to take the place of existing empty plant racks. The empty plant racks are then loaded onto the delivery truck so that they may be returned to the green house for reloading.

The plant rack and loading/unloading method of the present invention thus allows the plants to be ready for sale as soon as they are literally rolled off of the truck. This allows a tremendous time and labor savings to be realized in delivery operations. In addition, destructive human handling of the plants is minimized which results in greater plant condition and health. Once in the store, the racks allow the plants to be displayed in a space-efficient and easily mobile manner.

As shown in FIG. 7, the vertical members 104 feature a number of slots 110 extending along their lengths. The slots 110 receive tabs 112 extending from the corners 111 of shelves 102. As a result, the shelf spacing may be adjusted so that a single plant rack may accommodate a variety of plant sizes. As shown in FIGS. 6 and 7, the shelves 102 are spaced from one another so that the plants placed thereon may be easily watered and cared for. The shelf spacing also allows air to circulate past the bottom of the pots to provide root aeration so that the roots stay cool. This is beneficial to the health of the plants. The slots 110 of vertical members 104 are preferably sized larger than tabs 112 so that the shelves may be configured in a tilted orientation, as illustrated by shelf 114 in FIG. 7, for greater-product visibility and access.

It has been found that shelf spacing, indicated by dashed line 116 in FIG. 7, of approximately 18" allows for appropriate maintenance and aeration of typical one-gallon perennial plants. As shown in FIG. 7, a shelf depth, indicated by dashed line 118, of approximately 19" allows typical one-gallon perennial plants to be stored three deep in the spacer tray 80. A shelf width, indicated by dashed line 120 in FIG. 6, of approximately 53" allows four filled spacer trays 80 to be supported by each shelf 102, while an overall rack height, indicated by dashed line 122, of 81" inches allows the plants to be stacked five high. It has been found that these dimensions allow a maximum number of plants to be accommodated by plant rack 100 while still allowing it to be maneuvered, and the plants accessed, by a person. It is to be noted that these dimensions are presented as examples only and are intended in no way to limit the scope of the present invention.

The spacer tray 80, plant pot 90 and plant rack 100 may include indicia identifying the greenhouse or nursery that supplied the plants or some brand mark associated with the plants. For example, as shown in FIG. 6, a flip-out sign 200 may be attached to the plant rack 100 via hinges. This sign could be folded out of the way when the plant rack is empty or being loaded. The plant rack could also feature, positioned on the tops of vertical members 104, plastic top caps 202 molded in an identifying color. Identifying banners or a canopy could also be attached to the tops of the vertical members 104. The plant rack wheels 108 could also feature identifying color hubs 204. Spacer tray 80 could be molded in an identifying color and may also feature an embossed logo. The plant pots 90, preferably constructed of plastic, could also feature a unique and identifying color and design.

As shown in FIG. 7, the base 106 of rack 100 may have a bar code label 300 affixed thereto. Similarly, as shown in FIG. 4, bar code labels 302 and 304 may be affixed to spacer tray 80 and the label 35 of plant pot 90, respectively. Bar code label 304 could alternatively be attached to plant pot 90 directly. These bar code labels allow the rack, tray and pot to be tracked by the tracking subsystem of the system of the present invention in a number of useful ways. The tracking subsystem could be implemented with a variety of levels of sophistication and complexity. For the sake of discussion only, these levels will be described below in terms of three levels: the first level (the simplest), the second level (intermediate level of sophistication) and the third level (the most sophisticated).

The components of an embodiment of the tracking subsystem are shown in FIG. 8. As described above, a delivery truck 306 carries plant racks loaded with spacer trays filled with plants from a greenhouse 10 to a retail establishment such as a mass merchandiser's store 308. The greenhouse 10 is equipped with a bar code reading device or scanner 310 that is in communication with a greenhouse-based computer 312. The store 308 also has positioned therein a scanner 314 that is in communication with a store-based computer 316. The greenhouse computer 312 and the store computer 316 each contains a modem and may communicate via telecommunication lines as indicated at 318. Alternatively, the driver of delivery truck 306 may carry a hand-held bar code scanner 320 that communicates with the greenhouse computer via an RF (radio frequency) link 322.

According to the first level of implementation, the bar code label 300 of each rack 100 (FIG. 7) corresponds to a unique identifying serial number. Bar code 300 is scanned by bar code reading device 310 as the filled plant rack is loaded upon delivery truck 306 at the greenhouse 10. As the rack is unloaded at the store 308, bar code 300 is scanned via bar code scanners 314 or 320. This allows the greenhouse computer 312 to receive data on the delivery time and location for the rack. As a result, the greenhouse is able to track and generate reports pertaining to the delivery times and locations of its racks.

The second level of implementation allows the plant rack bar coding 300, the spacer tray bar coding 302 and the plant pot bar coding 304 (FIG. 4) to be utilized to help facilitate order picking, loading, accounting and shipping operations.

Figure 9:
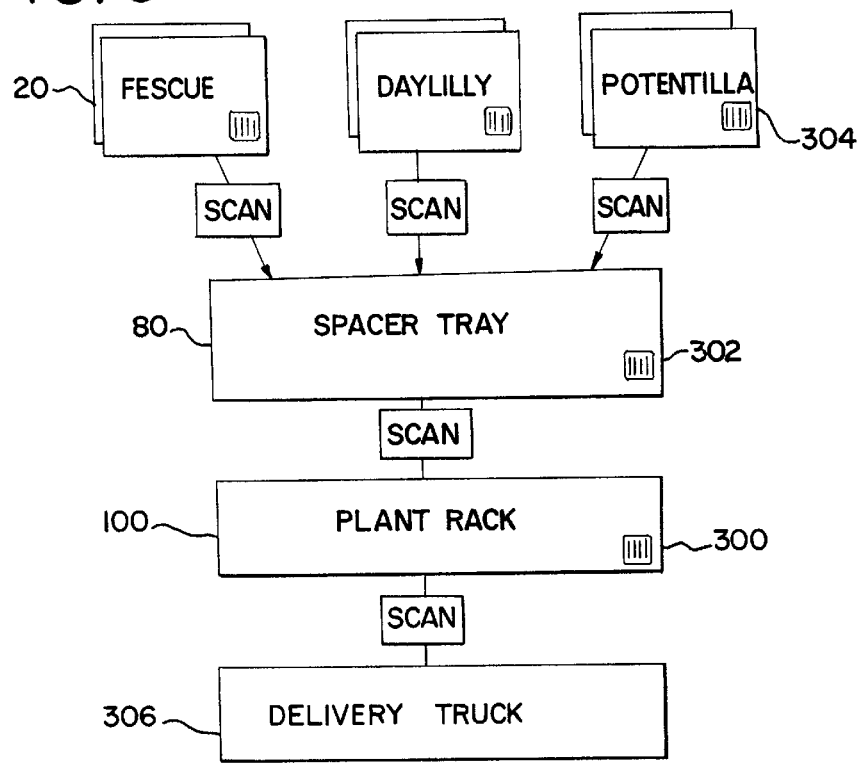
FIG. 9 is a block diagram illustrating a utilization of the tracking subsystem of FIG. 8.

A hand-held scanner 324 (FIG. 8) communicates with computer 312 via an RF link 326 (or some other connection 328) from the greenhouse growth area as individual plants are picked by a worker to fill an order and scanned. For example, referring to FIG. 9, a greenhouse worker picks two Fescue plants, two Daylilly plants and two Potentilla plants to fill an order. As each one of these plants 20 is loaded into a spacer tray 80, the greenhouse worker scans the plant bar code labels 304 with scanner 324. Once the tray 80 is completely loaded with the six plants, and the bar codes for the plants have been scanned, the worker scans the tray bar code label 302. The spacer tray 80 is then loaded onto a plant rack 100. The process is repeated until the plant rack 100 is completely filled with loaded spacer trays 80. At that time, the bar code label 300 is scanned and plant rack 100 is rolled onto delivery truck 306.

Plant bar code labels 304 include the UPC (universal price code) numbers which are used by the green house to identify the individual plants (or SKUs—stock keeping units) and assign prices to them. As a result, the greenhouse computer 312 contains data on the composition and value of the plants loaded upon each tray and rack. This allows shipping and accounts receivable paperwork to be generated. In addition, the greenhouse inventory records are adjusted.

According to the third level of implementation, the data associated with each rack is transmitted from greenhouse computer 312 to the store computer 316. As a result, the store is able to identify what inventory is in transit. Furthermore, each rack is then scanned via scanners 314 or 320 in as it is delivered to the store 308. The store inventory and accounting records are then updated.

While the preferred embodiments of the invention have been shown and described, it will be apparent to those skilled in the art that changes and modifications may be made therein without departing from the spirit of the invention, the scope of which is defined by the appended claims.

What is claimed is:

1. A method for tracking the distribution of potted plants from a greenhouse to a retail establishment comprising the steps of:
   a) generally filling a plant rack with potted plants;
   b) scanning a bar code label affixed to said plant rack so that an identifying serial number is recorded in a computer at the greenhouse;
   c) loading the filled plant rack onto a delivery vehicle;
   d) delivering the filled plant rack to the retail establishment by the delivery vehicle;
   e) unloading the filled plant rack from the delivery vehicle at the retail establishment;
   f) scanning the bar code label affixed to said plant rack at the retail establishment and transmitting the identifying serial number to the greenhouse computer;
   g) replacing a generally empty plant rack with the filled plant rack at a display position in the retail establishment;
   h) loading the generally empty plant rack onto the delivery vehicle; and
   i) returning the generally empty plant rack to the greenhouse by the delivery vehicle;
   whereby reports may be generated by the greenhouse computer regarding delivery times and identifying locations of plant racks utilized by the greenhouse.

2. The method of claim 1 wherein step a) includes the steps of:
   a)i) scanning a bar code label affixed to a potted plant so that identification and pricing information the potted plant is recorded by a computer at the greenhouse;
   a)ii) loading the scanned potted plant into a spacer tray;
   a)iii) repeating steps a)i) and a)ii) until the spacer tray is generally filled with scanned potted plants;
   a)iv) scanning a bar code label affixed to the spacer tray so that the plant composition and total pricing for the spacer tray is recorded by the greenhouse computer;
   a)v) loading the scanned spacer tray onto the plant rack; and
   a)vi) repeating steps a)i) through a)v) until the plant rack is generally filled with potted plants.

3. The method of claim 2 further comprising the step of processing the plant composition and the total pricing for the filled plant rack with the greenhouse computer so that reports pertaining thereto are produced.

4. The method of claim 2 further comprising the step of transmitting the plant composition and total pricing information for the filled plant rack from the greenhouse computer to the retail establishment before step d) so that the retail establishment knows of inventory in transit.

5. The method of claim 1 further comprising the step of:
   j) scanning a bar code label affixed to the returned generally empty plant rack so that an identifying serial number is recorded in the greenhouse computer.

6. A system for tracking the distribution of potted plants from a greenhouse to a retail establishment comprising:
   a) a plant rack including a plurality of shelves upon which said potted plants are disposed, said plant rack also including a bar code label affixed thereto containing an identifying serial number;
   b) said greenhouse including a bar code reading device and a computer that are in communication so that said plant rack bar code label may be scanned by the greenhouse bar code reading device and the identifying serial number contained therein may be recorded by the greenhouse computer;
   c) means for delivering said plant rack to said retail establishment; and
   d) a retail establishment bar code reading device in communication with said greenhouse computer so that said bar code label may be scanned upon arrival of said plant rack at said retail establishment whereby a delivery time and location for said plant rack may be determined so that the greenhouse computer may track and generate a report pertaining to the delivery time and the location of the plant rack.

7. The system of claim 6 wherein the plurality of shelves of the plant rack are tilted.

8. The system of claim 6 wherein said plant rack features vertical members with a plurality of slots therethrough and said plurality of shelves have corners with tabs extending therefrom with said tabs engaging said slots to support said shelves between said vertical members, said slots sized so that said shelves may be configured in a tilted orientation.

9. The system of claim 8 further comprising a flip-out sign attached to one of said vertical members in a pivoting fashion.

10. The system of claim 6 wherein the plurality of shelves of said plant rack are constructed of screened material.

11. The system of claim 6 further comprising spacer trays, each having a plurality of receptacles sized to receive said potted plants, said potted plants disposed within the plurality of receptacles of the spacer trays and said spacer trays positioned upon the shelves of said plant rack, said spacer trays including bar code labels affixed thereto that may be scanned by the greenhouse bar code reader so that identification and pricing information for the potted plants loaded in the spacer trays may be recorded by the greenhouse computer.

* * * * *